United States Patent [19]
Allen

[11] 3,947,814
[45] Mar. 30, 1976

[54] AUDIO TACHOMETER SYSTEM

[76] Inventor: James W. Allen, 3654 Lilac Ave. NW., Roanoke, Va. 24017

[22] Filed: Sept. 20, 1974

[21] Appl. No.: 507,704

[52] U.S. Cl. .................. 340/62; 340/263; 340/266
[51] Int. Cl.² ........................................ B60Q 5/00
[58] Field of Search ....... 340/53, 62, 262, 263, 266; 200/61.44

[56] References Cited
UNITED STATES PATENTS

| | | | |
|---|---|---|---|
| 2,484,038 | 10/1949 | Kirlin | 340/262 |
| 2,728,072 | 12/1955 | Magid | 340/263 X |
| 2,785,393 | 3/1957 | Mininberg | 340/263 X |
| 2,963,694 | 12/1960 | Baron | 340/62 X |

Primary Examiner—Alvin H. Waring
Attorney, Agent, or Firm—Stanley D. Schwartz

[57] ABSTRACT

An audio-tachometer system including an electronic tachometer having a first pointer for indicating engine speed, and a second pointer that is manually settable to a desired engine speed for shifting gears, wherein the engine speed corresponds to the speed at which the second pointer is set, an electrically conductive edge of the first pointer will bridgeably interconnect a pair of contacts mounted upon the second pointer to close an electrical circuit and thereby supply power to energize a signal means, e.g., audio tone generator.

11 Claims, 7 Drawing Figures

AUDIO TACHOMETER SYSTEM

BACKGROUND OF THE INVENTION

The field of this invention is generally related to tachometers for indicating engine speed, and is more specifically related to tachometer systems which emit an audible signal when a desired engine speed is attained.

In auto racing, drag racing, or other vehicle operation, wherein the attainment of maximum speed or optimum efficiency is desired, the transmission of the vehicle must be shifted at specific engine speeds. A driver of such a vehicle must monitor a tachometer to insure that he shifts the gears at optimum engine speeds. If the tachometer provides only visual indications of speed, the driver is distracted from observing the roadway in order to monitor the tachometer. Thus, for both safe and efficient operation of such vehicle, it is therefore desirable that the driver be given a signal indicating the proper time to shift gears, where thereby avoids distracting him from observing the roadway. An audible signal is ideally suited for that purpose.

A number of tachometer systems have been devised in the prior art for emitting an audible "alert" signal, when an engine has attained a specific speed. For example, Magid, U.S. Pat. No. 2,728,072, discloses a speedometer having an uninsulated speedometer needle 4 electrically grounded through a hair spring 8, the needle being movable to indicate vehicle speed upon a dial graduated in miles per hour. A contact member 18 is rotatably mounted on a shaft 16, wherein the contact 18 also serves as a pointer to permit it to be manually set at a desired speed. A free end of the pointer like contact member 18 is bent ninety degrees from its longitudinal axis, the free end being bent into the path of travel of the needle 4. When the needle 4 moves to the vehicle speed graduation at which contact 18 has been set, an edge portion of the needle 4 will engage the bent end of the contact member 18 to provide a ground path for an external circuit. Upon engagement of the needle 4 and contact member 18, current will flow from the external circuit, through the contact member 18, the needle 4, a shaft 6 to which the needle is attached, a hairspring 8 also attached to the shaft 6, and from the hairspring to ground. The external circuit includes an electrical buzzer 26, which is energized whenever needle 4 engages contact member 18, whereupon an audible buzz is emitted from the buzzer 26 to alert a driver that the vehicle has attained the speed at which contact member 18 is set.

The Magid patent also discloses a tachometer, as shown in FIG. 6, which is similar in construction to his speedometer, but includes two manually settable contact members 62 and 66 for engaging a needle 68 at different times to complete a ground path for an external circuit whenever the engine speed drops to a magnitude equal to that indicated by contact member 62, or increases in speed to a magnitude equal to or greater than that indicated by contact member 66. The Magid patent further discloses the use of a microswitch as his contact means, or the use of photoelectric means, in cooperation with a meter needle.

Baron, U.S. Pat. No. 2,963,694, discloses a speed alarm for vehicles including a cable driven speedometer having a manually settable pointer 32 mounted upon a mounting block 30. The mounting block 30 is rotatably mounted upon a shaft 24. A cantilever-like contact carrying member 36 has an end rigidly attached to the mounting block 30. The free end of the contact carrying member 36 has a button contact 38 rigidly mounted thereto. The speedometer also has a speed indicating needle 46 mounted upon another mounting block 44, the mounting block 44 being rigidly affixed to shaft 24. Also, another contact carrying member 42 is rigidly attached at one end to block 44 and has a button contact 40 attached to its free end. The contact carrying members 36 and 42 are aligned so that when their respective manually settable pointer 32 and needle 46 are indicative of identical vehicle speeds, their respective contacts 40 and 38 are closed upon one another thereby completing a series electrical circuit including a bell, whereupon the bell is energized to provide an audible signal to the vehicle driver indicating that a certain vehicular speed has been attained.

Prior art audio tachometer systems are characterized by a number of drawbacks, depending upon the system design. For instance, such systems utilizing cable and gear driven tachometers tend to be inaccurate due to backlash in the gearing and cable.

Systems using tachometers having driven needle or pointer speed indicators, which incorporate an electrical contact assembly with the driven needle must supply an inordinate magnitude of rotational force to the needle speed indicator and contact assembly to move the composite assembly to the dial graduation which indicates the actual engine speed. Such systems suffer from poor response time to abrupt changes in the speed of the engine, decreased reliability due to the extra wear upon moving parts, and increased assembly costs. Reliabilty is also decreased by the continual flexing of the wire connected to the electrical contact assembly that must move back and forth as the speed indicating needle moves in accordance with the changes in the engine speed.

SUMMARY OF THE INVENTION

Accordingly, with the problems of the prior art given above taken into consideration, it is a significant object of this invention to provide an improved audio tachometer system.

Another object is to provide an audio tachometer system including a tachometer having a speed indicating pointer of low mass.

A further object is to provide an improved and simplified audio tachometer system.

A still further object is to provide an audio tachometer system having improved accuracy and reliability thereby enabling the motor vehicle operator to operate his vehicle most efficiently and economically.

To accomplish the above objects, the audio tachometer system includes an electronic tachometer having a speed indicating pointer with an electrically conductive edge to bridgeably interconnect two elongated electrical contacts affixed to manually settable pointer. Whenever the indicating needle rotates to the engine speed position of the settable pointer, an electrical circuit is then completed thereby energizing an audio tone generator.

BRIEF DESCRIPTION OF THE DRAWINGS

The foregoing and other objects, features and advantages of the invention will be apparent from the following detailed description of the invention, as illustrated in the accompanying drawings, wherein like items are designated by the same numeral, in which.

DETAILED DESCRIPTION OF THE INVENTION

Figure 1:
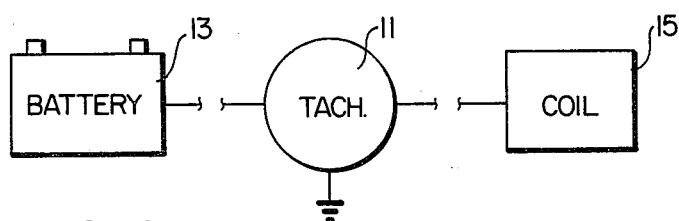
FIG. 1 illustrates the interconnection of a prior art electronic tachometer to a vehicle's electrical system.

Prior art electronic tachometer systems merely required, as shown in FIG. 1, the interconnection of the tachometer 11 between a source of power such as the vehicle battery 13 and vehicle ground, and to a source of pulses having a pulse repetition frequency analogous to the engine speed such as the terminal of the ignition coil 15 that is wired to the points of the vehicle distributor.

Figure 2:
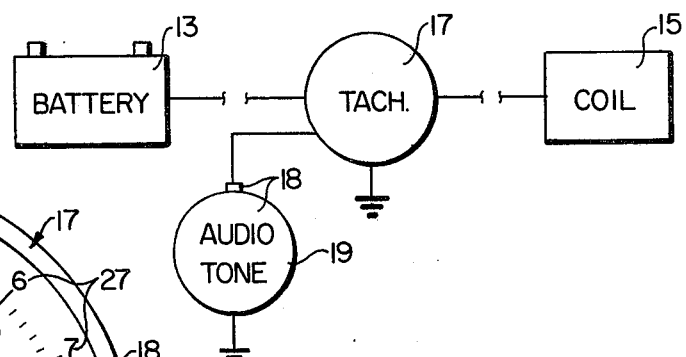
FIG. 2 illustrates the interconnection of the audio tachometer system of the invention to a vehicle's electrical system.

The subject invention with reference to FIG. 2, includes a modified electronic tachometer 17 and an audio tone generator 19. The audio tone generator 19 can be interconnected between the modified tachometer 17 and the vehicle ground. Similar to the prior art electronic tachometer 11, the modified electronic tachometer 17 is interconnected to a power source such as the vehicle battery 13, the vehicle ground, and to a source of pulses having a pulse repetition frequency analogous to the engine speed.

Figure 3:
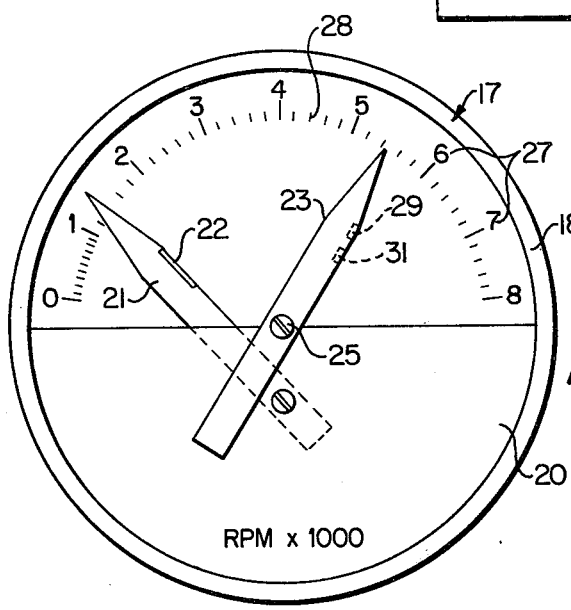
FIG. 3 is a frontal view of the tachometer included in the audio tachometer system of the invention.

The modified electronic tachometer 17 is illustrated in FIG. 3, and includes a bezel 18, a dial plate 20, a speed indicating pointer 21, a manually settable pointer 23 and a knob 25 for setting the manually settable pointer 23 to a desired engine speed. Numerals 27 and graduations 28 are printed on dial plate 20 to provide markings for measuring engine speed. The speed indicating pointer 21 is mounted between the dial plate 20 and settable pointer 23.

The knob 25 may be secured to the manually settable pointer 25 and a clear face plate (not shown), the face plate being located between the outer knob 25 and the inner settable pointer 23. Also, speed indicating pointer 21 may be secured to the drive means of the tachometer 17 in any one of a number of ways well known in the prior art.

Figure 4:
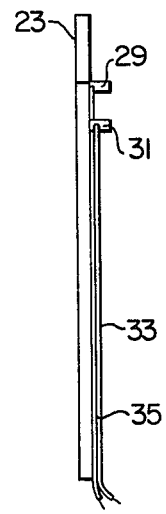
FIGS. 4(a) and (b) are edge views of the engine speed indicating pointer, and the manually settable pointer, respectively, of the audio tachometer system of the invention.

As illustrated in FIG. 4(a), the speed indicating pointer 21 has an electrically conductive edge or edge portion 22. The speed indicating pointer 21 may be fabricated from an electrically conductive material with at least edge portion 22 left uninsulated. If desired, the speed indicating pointer 21 can also be fabricated from a non-electrically conductive material with edge portion 22 made electrically conductive by an appropriate coating, impregnation, inlay, or coverings utilizing any of the method known in the prior art.

FIG. 4(b) shows an edge view of the manually settable pointer 23. Two elongated electrical contacts 29 and 31 are rigidly secured at their ends to the upper portion of the inner transverse face of the settable pointer 23, near the edge of the settable pointer 23 that normally faces away from the conductive edge portion 22 of the indicating pointer 21 (see FIG. 3). The contacts 29 and 31 are electrically isolated from one another, and vertically juxtaposed. FIG. 3 clearly shows the relation of the conductive edge 22 of indicating pointer 21 to the elongated contacts 29 and 31 of the settable pointer 23. Two wires 33 and 35 are individually connected to electrical contacts 31 and 29 respectively. The wires 33 and 35 are each secured to the inner transverse face of the manually settable pointer 23 in an appropriate manner.

An audio tone generator 19 is connected between the other end of wire 33 and the vehicle ground or power source return. The power source is preferably the vehicle battery 13. The other end of wire 35 is connected to the power source.

In operation, the speed indicating pointer 21 is rotated to the dial plate 20 graduation 28 indicative of the engine speed of the vehicle at a given time. It is assumed that the manually settable pointer 23 has been previously set to a desired engine speed by manually rotating knob 25.

Figure 5:
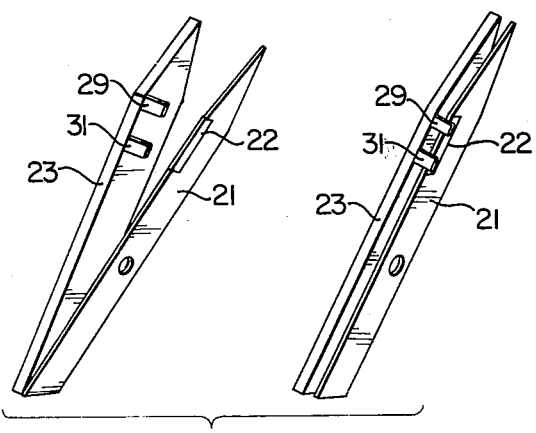
FIGS. 5 (a) and (b) show the speed indicating pointer of the tachometer of the invention in non-bridging and bridging positions respectively, with the contacts of the manually settable pointer as viewed from the back of the tachometer.

If the engine speed is less than the engine speed to which the usually settable pointer 23 has been set, the conductive edge 22 of the indicating pointer 21 will not bridge the electrical contacts 29 and 31 of the settable pointer 23 (see FIG. 5(a)). However, when the engine speed increases to a speed that is equal to or greater than the engine speed to which the manually settable pointer 23 has been set, the speed indicating pointer 21 will rotate to a position where it will be overlapped by settable pointer 23 wherein the conductive edge 22 of the speed indicating pointer 21 will bridge the electrical contacts 29 and 31 of the settable pointer 23 (FIG. 5(b)). When the bridging occurs, the power source or battery 13 will be interconnected through a series circuit including wire 33, contact 29, the electrically conductive edge 22, contact 31, and wire 33 to the power input terminal 18 of the audio tone generator 19 whereupon the tone generator will be energized to emit an audible tone. The tone emitted by the generator 19 will alert the driver of the motor vehicle that the engine has reached a desired speed or shifting point.

Although one particular embodiment and use of the subject invention has been described, it is not intended that the invention be so limited. As is evident to one skilled in the art, many other uses and embodiments of the invention are rendered obvious by the above detailed disclosure within the scope and spirit of the invention. For example, the audio tone generator 19 could be replaced by or used in conjunction with signal lights. Also, the meter switch means including the indicating pointer 21 with a conductive edge 22 and the manually settable pointer 23 could be used in any other meter system incorporating a means for moving a pointer to a given scale graduation.

What is claimed is:

1. An audio tachometer system comprising:
   an electronic tachometer including a first pointer and a second pointer, said first pointer being indicative of engine speed, said second pointer being manually settable to a desired engine speed;
   an audio tone generator having a voltage input terminal;
   a voltage source;
   a pair of electrical contacts, each being electrically isolated form the other and rigidly mounted upon said second pointer, one of said contacts being interwired to said voltage source, the other of said contacts being interwired to said voltage input terminal of said audio tone generator; and electrically conductive means upon said first pointer for bridgeably interconnecting said pair of contacts whenever said first pointer is positioned at the engine speed indicated by the second pointer, thereby interconnecting said voltage source to said voltage input terminal of said audio tone generator to energize said tone generator.

2. The audio tachometer system of claim 1, wherein each one of said pair of electrical contacts are shaped, dimensioned and oriented to extend from a transverse face of said second pointer, so as to be within the path of travel of said electrically conductive means upon said first pointer, and are juxtapositioned one to the other.

3. The audio tachometer system of claim 1, wherein said electrically conductive means upon said first pointer is an uninsulated edge of said first pointer, said first pointer being fabricated from an electrically conductive material.

4. The audio tachometer system of claim 1, wherein said electrically conductive means upon said first pointer is an electrical conductor rigidly mounted along its length to an edge of said first pointer, said conductor being uninsulated along its length.

5. The audio tachometer system of claim 1, which further includes a pair of flexible wires, each one of said pair of wires having a portion rigidly attached to said second pointer, said pair of flexible wires being used to electrically connect said pair of contacts to said voltage source and to said voltage input terminal of said audio tone generator, respectively.

6. A tachometer system comprising:
an electronic tachometer including a first pointer and a second pointer, said first pointer being indicative of engine speed, and said second pointer being manually settable to a desired engine speed;
means for providing a signal, said signal means having a voltage input terminal:
a voltage source;
a pair of electrical contacts, each being electrically isolated form the other and rigidly mounted upon said second pointer, one of said contacts being interwired to said voltage source, the other of said contacts being interwined to said voltage input terminal of said signal means; and
electrically conductive means upon said first pointer for bridgeably interconnecting said pair of contacts whenever said first pointer is positioned at the engine speed indicated by the second pointer, thereby interconnecting said voltage source to said voltage input terminal of said signal means to energize said signal means.

7. The tachometer system of claim 6, wherein each one of said pair of electrical contacts are shaped, dimensioned, and oriented to extend from a transverse face of said second pointer, so as to be within the path of travel of said electrically conductive means upon said first pointer, and are juxtapositioned one to the other.

8. The tachometer system of claim 6, wherein said electrically conductive means upon said first pointer is be uninsulated edge of said first pointer, said first pointer being fabricated from an electrically conductive material.

9. The tachometer system of claim 6, wherein said electrically conductive means upon said first pointer is an electrical conductor rigidly mounted along its length to an edge of said first pointer, said conductor being uninsulated along its length.

10. The tachometer system of claim 6, which further includes a pair of flexible wires, each one of said pair of wires having a portion rigidly attached to said second pointer, said pair of flexible wires being used to electrically connect said pair of contacts to said voltage source and to said voltage input terminal of said signal means, respectively.

11. The tachometer system of claim 6, wherein said means for providing a signal includes an audio tone generator.

* * * * *